July 26, 1938. L. E. LA BRIE 2,124,785
BRAKE
Filed July 12, 1935 3 Sheets—Sheet 2
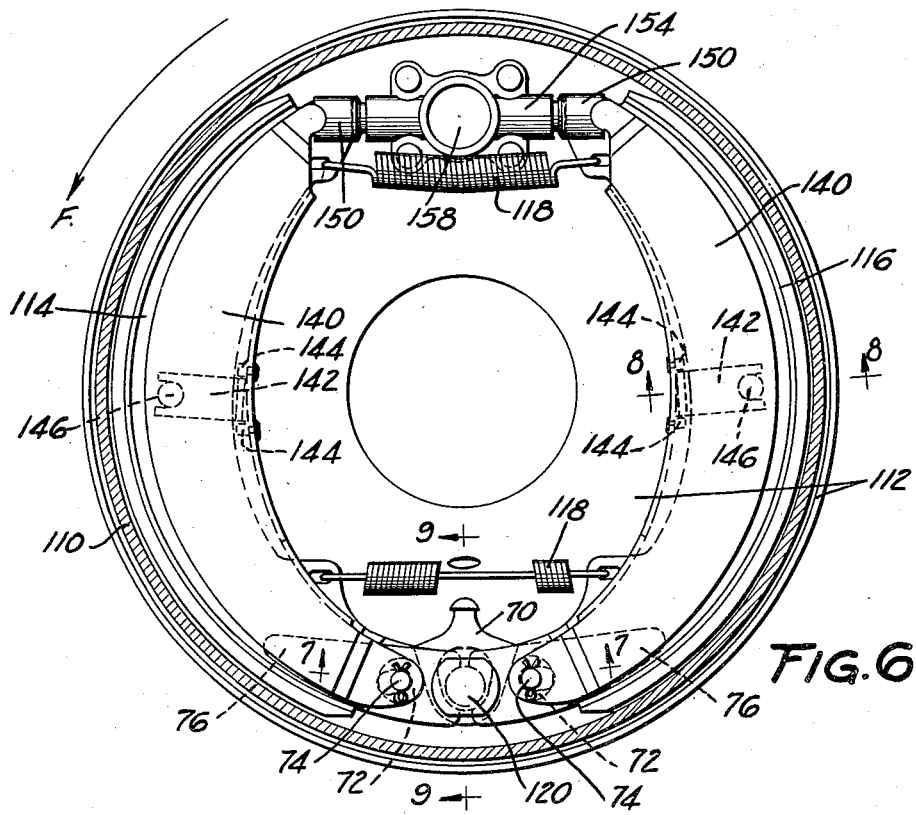
FIG.6
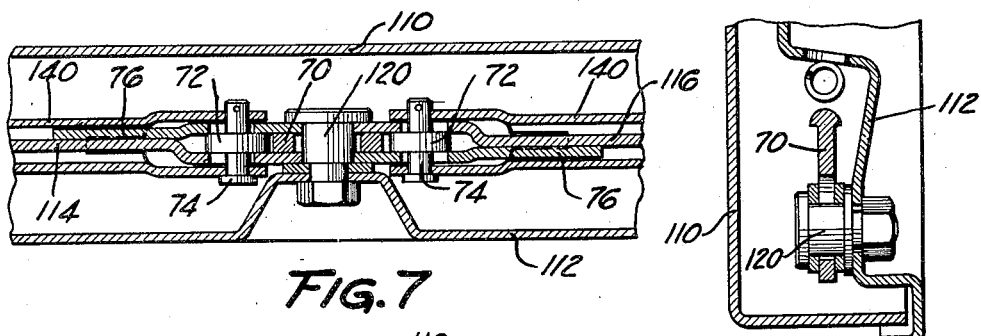
FIG.7
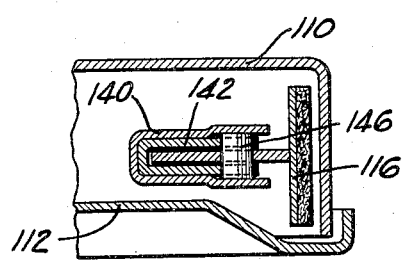
FIG.8
FIG.9
INVENTOR.
LUDGER E. LaBRIE
BY
ATTORNEY.

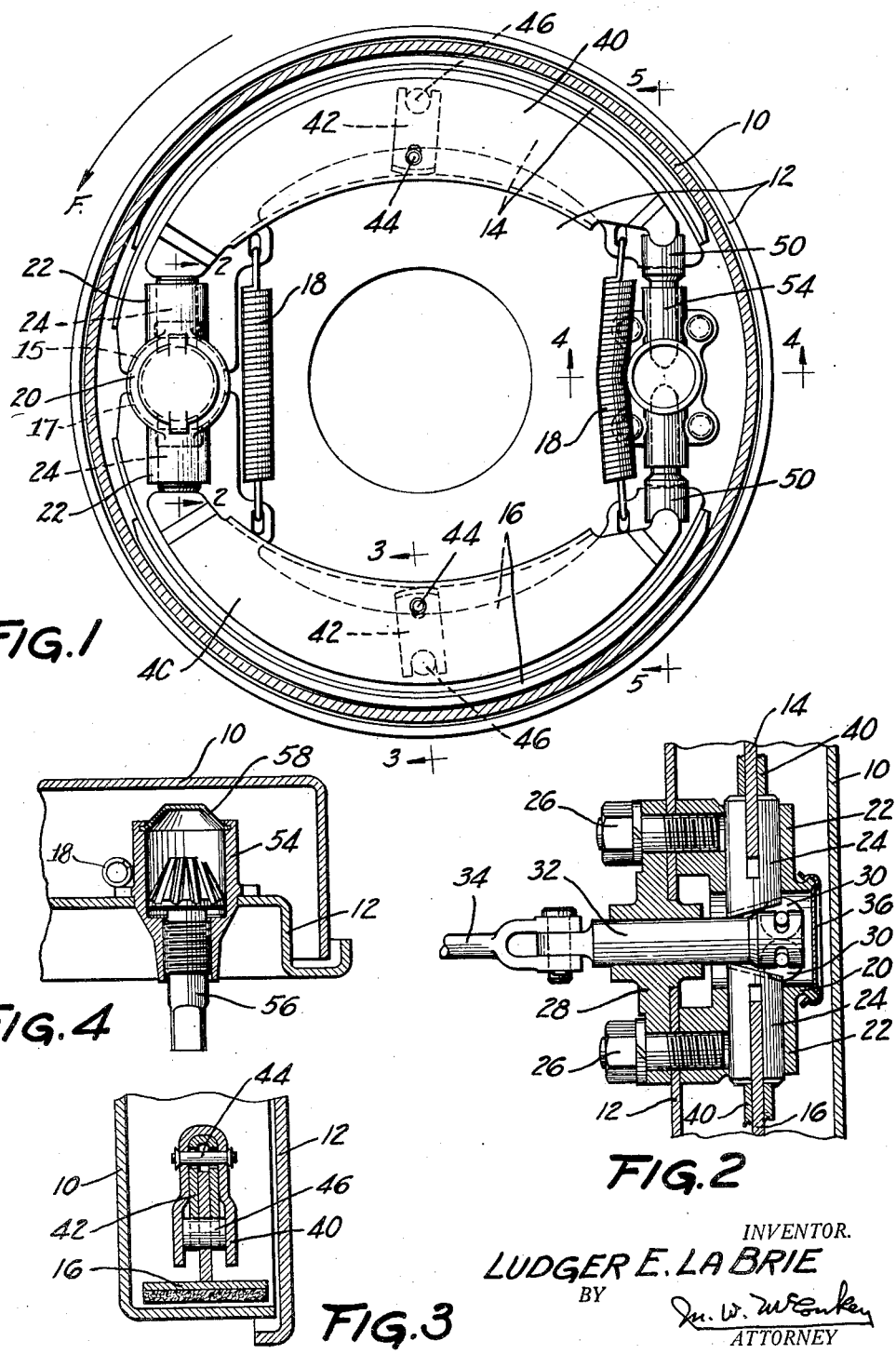

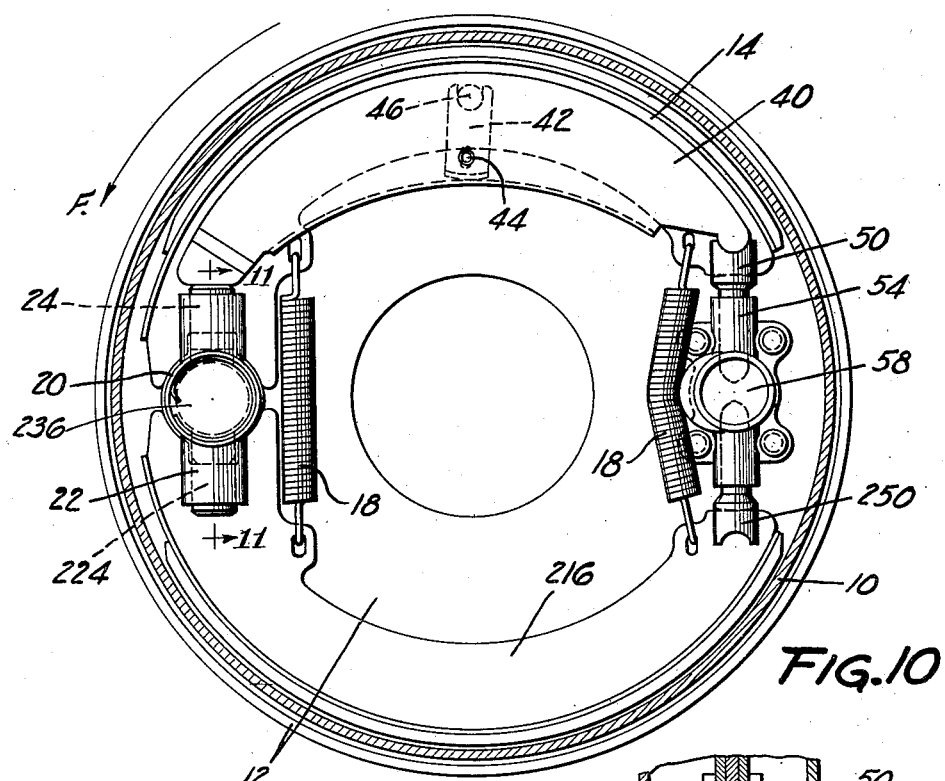
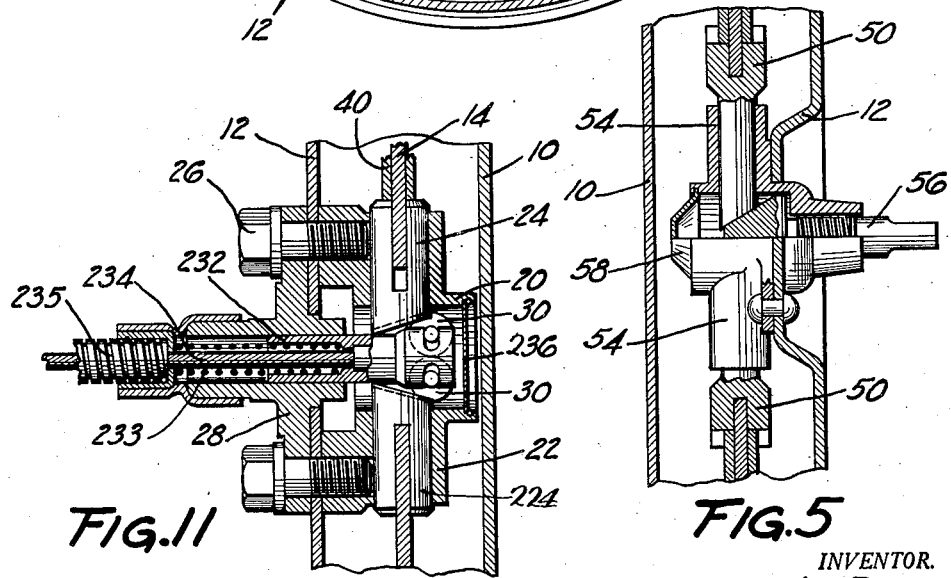

Patented July 26, 1938

2,124,785

UNITED STATES PATENT OFFICE 2,124,785

BRAKE

Ludger E. La Brie, South Bend, Ind., assignor to Bendix Products Corporation, South Bend, Ind., a corporation of Indiana Application July 12, 1935, Serial No. 30,959

28 Claims. (Cl. 188—78)

This invention relates to brakes, and is illustrated as embodied in an internal expanding brake for an automobile.

An important object of the invention is to simplify the adjustment and operation of a brake of the type having a plurality of shoes which are individually shiftable to anchor at opposite ends in forward braking and in reverse braking. Preferably the shoe anchorages are on the brake backing plate, and one feature relates to adjusting them for wear simultaneously with the applying means which acts on the shoes, to give a single adjustment for each brake.

In one desirable arrangement, the shoes are applied by levers fulcrumed on the brake anchorage means in such a manner that adjusting the anchorage means also shifts the fulcrums of the levers, thereby adjusting for wear of the brake lining both the anchorage means and the applying means.

The brakes illustrated in the drawings have the levers centrally connected to the individually-shiftable shoes respectively, for example by a novel structural arrangement in which a U-section lever fulcrumed as above described embraces and pivotally engages a thrust link which itself may, and preferably is, of U-section arranged to embrace the shoe web. The link may, if desired, conveniently be connected to the shoe web by a pivot held against endwise movement by the sides of the U-section lever.

Many of the advantages of the invention can be secured in a simple and effective structure by providing one of the above-described levers for one shoe and operating the other shoe direct, an arrangement which I believe to be entirely new.

Other objects and features of the invention, including various novel combinations of parts and desirable particular constructions, will be apparent from the following description of the illustrative embodiments shown in the accompanying drawings, in which:

Figure 1 is a section through one embodiment, taken just inside the head of the brake drum, and showing the shoes in side elevation;

Figure 2 is a partial section on the line 2—2 of Figure 1, showing part of the applying means;

Figure 3 is a partial section on the line 3—3 of Figure 1, showing the link connecting one shoe and its lever;

Figure 4 is a partial section on the line 4—4 of Figure 1 showing part of the adjustment;

Figure 5 is a partial section on the line 5—5 of Figure 1, showing the adjustment of the brake anchorage and of the fulcrums of the levers;

Figure 6 is a section corresponding to Figure 1, but showing a slightly different embodiment;

Figure 7 is a partial section on the line 7—7 of Figure 6, showing the brake anchorage at the bottom of the brake, and showing part of the applying means;

Figure 8 is a partial section on the line 8—8 of Figure 6, showing the link connecting one shoe and its lever;

Figure 9 is a partial section on the line 9—9 of Figure 6, showing part of the applying means;

Figure 10 is a section corresponding to Figure 1, but showing a lever-mounted shoe associated with a direct-operated shoe; and Figure 11 is a partial section therethrough on the line 11—11 of Figure 10, showing the operating means.

The brake illustrated in Figures 1-5 includes a rotatable drum 10, at the open side of which is a support such as a backing plate 12, which cooperates with the drum to form a substantially closed chamber housing the friction means of the brake.

The friction means illustrated includes two T-section shoes 14 and 16 faced with suitable lining and which are individually shiftable to anchor at opposite ends in forward and reverse braking, according to the direction of drum rotation. The shoes are connected by suitable return springs 18.

At the left-hand side of the brake the anchorage parts engaged by the shoes comprise the opposite sides of a cylindrical central portion 20 of a fitting engaging the inside of the backing plate and having tubular wings or ends 22 housing plungers 24 and secured to the backing plate by means such as machine screws 26 engaging a bearing member 28 seated against the outside of the backing plate. The shoe webs have semicircularly notched ends 15 and 17 embracing the anchor 20 between them, and forming pivots through one or the other of which (according to the direction of drum rotation) the corresponding shoe anchors when the drum is applied.

The plungers 24 are slotted to embrace, without having any direct engagement with the ends of, the shoe webs, so that they do not operate the shoes directly. They are beveled at their ends for wedging operative engagement with a pair of rollers or the like 30, which balance against each other by direct engagement with each other, and which have axial pins seated in operating slots in the head of a fitting or plunger 32 slidable in the bearing 28 at right angles to the backing plate, and operated by any suitable connection 34. The anchorage part 20—22 has an opening, closed by a removable cap 36, through which the plunger 32 may be inserted.

The plungers 24 are in operative thrust engagement with the ends of two operating levers 40, preferably U-shaped in section and arranged with their sides embracing the webs of the shoes. Thus the plungers 24 engage the levers 40 on both sides of the webs of the shoes, as shown in Figure 2.

The levers 40 are preferably centrally connected to the floating and individually-shiftable shoes 14 and 16, for example by novel U-section links 42, shown pivotally seated at their inner ends against the bottom of the channels of the U-section levers 40, and held against displacement by means such as pins 44. The outer ends of links 42 are shown pivotally connected to the shoe webs by pivots 46 held against endwise movement by the sides of the U-section levers 40.

The levers 40, at the right-hand side of the brake, in this embodiment, fulcrum on plungers 50 which, like the plungers 24, are slotted to receive and embrace the webs of the shoes. In this case, however, the ends of the shoe webs seat against, and have anchoring engagement with, the bottoms of the slots in the plungers 50. Thus endwise movement of the plungers 50 simultaneously adjusts the shoe anchorage and the fulcrums of the levers.

The plungers 50 are slidably mounted in the tubular ends or wings of an anchorage fitting 54, and engage at their ends the fluted conical end of an adjustment member 56 which is operatively threaded through the fitting 54 (and through the backing plate) at right angles to the backing plate 12. Thus tightening up on the member 56 forces the plungers 50 apart to make the above-described adjustment for wear. It will be noted that this gives a single adjustment for each brake. A welch plug 58 permits the member 56 to be inserted in the fitting 54.

The brake illustrated in Figures 6–9 has parts corresponding to those in Figures 1–5 indicated by the same reference characters increased by 100. The links 142 in this brake are prevented from shifting on the levers 140 by pairs of rivets 144 instead of the pins 44. The principal differences, however, are at the bottom of the brake.

This brake is intended for operation by the standard plunger (not shown) movable axially of the kingpin of the front wheel of a "Ford" car.

This "Ford" plunger has universal thrust engagement with the ball end of a wedge 70 slotted to embrace slidably a fixed anchor post 120 carried by the backing plate. The wedge 70 engages rollers 72 received between, and having axial pins 74 each passing through enlarged clearance openings in, a pair of parallel plates one of which is the web of the shoe 114 or 116 and the other of which is a separately-formed plate or stamping 76 spot-welded to the side of the shoe web. Pins 74 are pivotally seated in the sides of the U-section levers 140.

Thus vertical movement of the wedge 70 actuates the two levers 140 without any direct action on the shoes except to position them sidewise.

The brake shown in Figures 10 and 11 has one shoe 14 operated by a lever 40 as described above, and which is associated with a shoe 216 which is directly operated. The lower plunger 250 thus acts directly on the web of shoe 216 only, while the upper one abuts against both the web of shoe 14 and the lever 40.

Similarly the lower plunger 224 directly engages the web of shoe 216, instead of having a clearance as between the upper plunger 24 and the web of shoe 14. In the illustrated applying means, the plunger 232 is operated against the resistance of a return spring 233 by a cable or the like 234 arranged in a flexible housing 235 of any desired construction, the whole forming a Bowden control.

In this embodiment, it will be noted that the lower shoe directly applying device operates the lower shoe directly and the upper one through the lever 40, while the shoe anchorages 50 and 250 act directly on the two shoes and also the upper one acts on the fulcrumed end of the lever 40, so that the lever is adjusted simultaneously with the shoes. The lower shoe actuator 224 does not require any adjustment, as it acts on the end of the shoe instead of the central portion as in the case of the lever 40.

It will be noted that the floating of the rollers 30 allows for the shifting of the shoes to anchor at either end, without requiring the entire applying means to float. The applying means therefore applies a balanced thrust directly tangentially against the end of the lower shoe 216 and (through the lever 40) radially against the shoe 14 approximately at its center.

While three illustrative embodiments have been described in detail, it is not my intention to limit the scope of my invention to those particular embodiments, or otherwise than by the terms of the appended claims.

I claim:

1. A brake comprising a pair of floating brake shoes, anchorage means engageable with the opposite ends of the shoes individually in forward and in reverse braking, means for forcing said shoes against the drum to apply the brake and including pivotally mounted members extending alongside of and acting on said shoes, and means for simultaneously adjusting the anchorage means at one side of the brake and the shoe-forcing means to compensate for wear of said shoes.

2. A brake comprising a pair of floating brake shoes, anchorage means engageable with the opposite ends of the shoes individually in forward and in reverse braking, applying levers acting on said shoes between their ends, and means for simultaneously adjusting the anchorage means and the fulcrums of the applying levers to compensate for wear of said shoes.

3. A brake comprising a pair of levers, shoes respectively actuated by said levers, operating means engaging said levers at one side of the brake, anchorages for said shoes adjacent said operating means, and adjustable means at the other side of the brake on which said levers are fulcrumed and which also serves as an anchorage for said shoes.

4. A brake comprising a pair of levers, shoes respectively actuated by said levers, operating means engaging said levers at one side of the brake, anchorages for said shoes adjacent said operating means, and anchorages at the other side of the brake on which said levers are fulcrumed respectively.

5. A brake comprising a pair of levers, shoes respectively actuated by said levers, operating means engaging said levers at one side of the brake, anchorages for said shoes adjacent said operating means, and anchorages at the other other side of the brake on which said levers are fulcrumed respectively, said last-named anchorages being adjustable to compensate both the anchorage and the operation of the shoes for wear.

6. A brake comprising a pair of levers, shoes respectively actuated by said levers, operating means engaging said levers at one side of the brake, anchorages for said shoes adjacent said operating means, and anchorages at the other side of the brake on which said levers are fulcrumed respectively, said last-named anchorages including plungers adjustable apart to compensate for wear of the shoes, and each of which is engaged by one of the levers and one of the shoes.

7. A brake comprising a backing plate, a pair of levers having fulcrums supported by the backing plate, a brake shoe centrally connected to each lever by means permitting the shoe to shift lengthwise in both directions relatively to the lever, and anchorages at both ends of both shoes.

8. A brake comprising a backing plate, a pair of levers having fulcrums supported by the backing plate, a brake shoe centrally linked to each lever, anchorages at both ends of both shoes, and means for adjusting two of the anchorages and simultaneously shifting the fulcrums of said levers to compensate for wear of the shoes.

9. A brake comprising a shoe having a stiffening web, a U-section two-arm link embracing said web and having the ends of its arms connected to the web by a pivot, and a U-section operating lever embracing the web and link and having its sides confining the pivot against endwise movement.

10. A brake comprising a shoe having a stiffening web, a U-section two-arm link embracing said web and having its arms connected to the web, and a U-section operating lever embracing the web and link and pivotally connected to the end of said link.

11. A brake comprising a backing plate having shoes mounted thereon and provided with anchorage means engaged by the ends of the shoes, a pair of levers arranged to apply the shoes, and lever-operating means associated with and in part guided by said anchorage means.

12. A brake comprising a backing plate having shoes mounted thereon and provided with an anchor post engaged by the ends of the shoes, a pair of levers arranged to apply the shoes, and lever-operating means associated with said anchorage means and including a part movable crosswise of said anchor post.

13. A brake comprising a backing plate having shoes mounted thereon, an anchor fitting having a part engaged by the ends of the shoes and having tubular guides containing plungers, means for forcing said plungers apart, and shoe-operating levers engaged at their ends by said plungers.

14. A brake comprising a backing plate having shoes mounted thereon, two anchor fittings at opposite sides of the brake each having tubular guides containing plungers, means for forcing said plungers apart, and shoe-operating levers engaged at their ends by said plungers, said levers fulcruming on the plungers in one anchor fitting and being actuated by the plungers in the other anchor fitting.

15. A brake comprising a backing plate having shoes mounted thereon, an anchor fitting having a part engaged by the ends of the shoes and having tubular guides containing plungers, a plunger having means wedging against the first plungers and movable at right angles to the backing plate and having a bearing secured to the backing plate by devices also securing the anchorage fitting thereto, for forcing said plungers apart, and shoe-operating levers engaged at their ends by said plungers.

16. A brake comprising a backing plate having shoes mounted thereon, an anchor fitting having a part engaged by the ends of the shoes and having tubular guides containing plungers, a plunger having means wedging against the first plungers and movable at right angles to the backing plate, for forcing said plungers apart, and shoe-operating levers engaged at their ends by said plungers.

17. A brake comprising two shoes, each having anchorages at its opposite ends, a non-adjustable applying device acting on the end of one shoe, a device acting on the other shoe between its ends and operable to force it to applied position, means for adjusting the effective action of said device, and spreading means acting on the two devices in opposite directions to apply the brake.

18. A brake comprising two shoes, each having anchorages at its opposite ends, a non-adjustable applying device acting on the end of one shoe, a device acting on the other shoe between its ends and operable to force said other shoe to applied position, means acting through said devices to apply the brake, and common means for adjusting the effective operation of the second device and two of the shoe anchorages.

19. A brake comprising two shoes each of which is shiftable to anchor alternatively at either end, a pivoted lever arranged to act on one shoe between its ends, and applying means acting on said lever and acting directly on the other shoe, said applying means being arranged between and acting on the free end of the lever and said other shoe.

20. A brake comprising two shoes each of which is shiftable to anchor alternatively at either end, a lever pivoted adjacent the end of one shoe and arranged to act on said one shoe between its ends, and applying means between the free end of the lever and the end of the other shoe and arranged adjacent the other end of said one shoe and adapted to act on said lever and adapted to act directly on the other shoe.

21. A brake comprising two shoes, anchorage means for said shoes, a lever pivoted adjacent the end of one shoe and acting on said shoe between its ends, and applying means adjacent the other end of said one shoe including a pair of guided coaxial plungers one of which acts directly on the other shoe and the other of which engages the lever adjacent the said one shoe.

22. A brake comprising two shoes, anchorage means for said shoes, a lever pivoted adjacent the end of one shoe and acting on said shoe between its ends, and applying means adjacent the other end of said one shoe including a pair of guided coaxial plungers one of which acts directly on the other shoe and the other of which engages the lever adjacent the said one shoe, the second plunger being slotted and embracing a part of said one shoe without applying thrust thereto.

23. A brake comprising two shoes one of which has an applying lever associated therewith, and applying means between the free end of the applying lever and the end of the other of the shoes and adapted to act on said lever and directly on the other of said shoes.

24. A brake comprising two floating shoes each having fixed anchorages at its opposite ends, and applying means acting tangentially on the end of one shoe and radially on the other shoe approximately at its center.

25. A brake comprising two shoes having stiffening webs, aligned guided plungers having slots embracing the ends of the webs and having means for forcing them apart to apply the brake, the bottom of the slot in one plunger engaging the end of its shoe web to apply thrust thereto and the slot in the other plunger being too deep to engage the end of the web of the other shoe, and thrust transmitting means actuated by said other plunger and acting on said other shoe between its ends.

26. In a brake, a floating brake shoe, anchorage means engageable with the opposite ends of the shoe individually in forward and reverse braking, an applying lever acting on said shoe between its ends, and means for simultaneously adjusting one of said anchors and the fulcrum of the applying lever to compensate for wear of said shoe.

27. In a brake, a floating brake shoe, a fixed anchor at one end of said shoe, an adjustable anchor at the other end, and an applying lever engaging said shoe between its ends and fulcrumed on said adjustable anchor so as to be adjusted therewith.

28. A brake comprising two shoes individually shiftable to anchor at their opposite ends, a lever extending around one side of the brake and acting on one of the shoes, and applying means acting jointly on the end of said lever and the end of the other shoe.

LUDGER E. LA BRIE.